(12) United States Patent
Soavi et al.

(10) Patent No.: US 10,396,349 B2
(45) Date of Patent: Aug. 27, 2019

(54) SEMI-SOLID FLOW LI/O2 BATTERY

(71) Applicant: ALMA MATER STUDIORUM—Universita' di Bologna, Bologna (IT)

(72) Inventors: Francesca Soavi, Bologna (IT); Catia Arbizzani, Bologna (IT); Irene Ruggeri, Rome (IT)

(73) Assignee: ALMA MATER STUDIORUM—Universita'di Bologna, Bologna (IT)

( * ) Notice: Subject to any disclaimer, the term of this patent is extended or adjusted under 35 U.S.C. 154(b) by 89 days.

(21) Appl. No.: 15/748,299

(22) PCT Filed: Jul. 29, 2016

(86) PCT No.: PCT/IB2016/054547
§ 371 (c)(1),
(2) Date: Jan. 29, 2018

(87) PCT Pub. No.: WO2017/021840
PCT Pub. Date: Feb. 9, 2017

(65) Prior Publication Data
US 2018/0226632 A1    Aug. 9, 2018

(30) Foreign Application Priority Data
Jul. 31, 2015   (IT) .................. 102015000040796

(51) Int. Cl.
*H01M 4/02*    (2006.01)
*H01M 4/134*   (2010.01)
(Continued)

(52) U.S. Cl.
CPC .......... *H01M 4/134* (2013.01); *H01M 4/382* (2013.01); *H01M 4/583* (2013.01); *H01M 4/663* (2013.01);
(Continued)

(58) Field of Classification Search
CPC ..................................................... H01M 4/02
See application file for complete search history.

(56) References Cited

U.S. PATENT DOCUMENTS

2015/0171398 A1*  6/2015  Roumi ................ H01M 2/1673
                                                                429/7

FOREIGN PATENT DOCUMENTS

DE    102010033020 A1    2/2012
JP       2014022281 A    2/2014
(Continued)

OTHER PUBLICATIONS

Monaco S., et al., "Role of oxygen mass transport in rechargeable Li/O2 batteries operating with ionic liquids," J. Phys. Chem. Lett 2013, 4, 1379-1382.
(Continued)

*Primary Examiner* — Jacob B Marks
(74) *Attorney, Agent, or Firm* — Silvia Salvadori, P.C.; Silvia Salvadori (57) ABSTRACT

The present disclosure relates to a lithium oxygen battery with a non-aqueous flowable semi-solid catholyte comprising an electrolyte, dissolved oxygen and carbonaceous particles which are not soluble in the catholyte. The battery also comprises a lithium anode, electrical contacts, an oxygen inlet, a porous cathode current collector and a pump. The oxygen-enriched catholyte is pumped through the cell of the battery and the oxygen redox reaction may take place on the carbonaceous particles which form a conducting percolating network. Also disclosed is a semi-solid, non-aqueous catholyte comprising an electrolyte, dissolved oxygen and carbonaceous particles; the use of the lithium oxygen battery; and the use in electric vehicle and for stationary applications.

17 Claims, 8 Drawing Sheets

(51) Int. Cl.
*H01M 4/38* (2006.01)
*H01M 4/86* (2006.01)
*H01M 12/08* (2006.01)
*H01M 4/583* (2010.01)
*H01M 4/66* (2006.01)
*H01M 10/052* (2010.01)
*H01M 10/056* (2010.01)
*H01M 4/96* (2006.01)

(52) U.S. Cl.
CPC ....... *H01M 4/8615* (2013.01); *H01M 10/052* (2013.01); *H01M 10/056* (2013.01); *H01M 12/08* (2013.01); *H01M 4/96* (2013.01); *H01M 2004/8689* (2013.01); *H01M 2220/10* (2013.01); *H01M 2220/20* (2013.01); *H01M 2300/0025* (2013.01); *Y02E 60/128* (2013.01)

(56) References Cited

FOREIGN PATENT DOCUMENTS

| | | | |
|---|---|---|---|
| WO | 2012023019 | A1 | 2/2012 |
| WO | 2014014548 | A2 | 1/2014 |

OTHER PUBLICATIONS

Search Report and Written Opinion of PCT/IB2016/054547 dated Sep. 28, 2016.

\* cited by examiner

SEMI-SOLID FLOW LI/O2 BATTERY

This application is a U.S. national stage of PCT/IB2016/054547 filed on 29 Jul. 2016 which claims priority to and the benefit of Italian Application No. 102015000040796 filed on 31 Jul. 2015, the content of which are incorporated herein by reference in their entireties.

In general, the present disclosure relates to lithium oxygen batteries. Specifically, the present disclosure relates to lithium oxygen flow batteries comprising a semi-solid electrolyte and to their use for stationary applications, in particular as batteries for renewable energy plants, and in the automotive sector, in particular as batteries for electric vehicles.

BACKGROUND

Climate change has become a growing concern over the past years and much research has been directed to the provision of new energy sources and efficient means for storing and converting energy. Among the energy storage and conversion devices investigated, lithium oxygen batteries, also known as lithium air batteries, have been found to present many advantages over conventional electrochemical cells and lithium batteries. Lithium oxygen ($Li/O_2$) batteries can use oxygen from the air instead of storing an internal oxidant. Due to the very high specific capacity of the oxygen cathode and lithium anode, lithium oxygen batteries have attracted much interest from scientists both in industry and in academia. For example, the practical specific energy of lithium oxygen batteries is 500 W h $kg^{-1}$, which is 2 to 3 times higher than that of the best lithium-ion batteries available today on the market.

$Li/O_2$ batteries are comprised of a lithium anode, a cathode and an electrolyte. The oxygen redox reaction (ORR) takes place at the solid cathode/electrolyte interface. The solid cathode is a carbon/catalyst layer which is fed by oxygen; the anode is typically a Li metal foil. In non-aqueous, aprotic $Li/O_2$ batteries, the cathode reaction involves the formation of superoxide, peroxide and oxide species of lithium on the cathode surface. During recharge, such species are expected to be reoxidized to give oxygen gas. The low conductivity of solid lithium peroxide and solid lithium oxide causes electrode insulation, affects cathode discharge capacity and determines high cathode recharge overpotentials. While cathode discharge potentials are approximately 2.5-2.7 V vs. $Li^+/Li$, recharge potentials are typically higher than 3.5 V vs. $Li^+/Li$. This makes the choice of electrolytes crucial.

While carbonate and ether based electrolytes are not stable towards oxygen radical species or to the high potentials required for recharge, dimethyl sulfoxide, ionic liquids and tetraethylene glycol dimethyl ether (TEGDME) based electrolytes are considered to be good alternatives. To date, two types of non-aqueous $Li/O_2$ battery configurations have been reported: air breathing cells, where the cathode is in direct contact with gaseous oxygen (or air) and flow cells, where the electrolyte is fed with oxygen.

Redox flow batteries are another type of battery and have a two electrolyte system in which the two-electrolytes, acting as liquid energy carriers, are pumped simultaneously through the two half-cells of the reaction cell separated by a membrane. The membrane allows the passage of ions and thus facilitates ion exchange between the two electrolytes. Electrons which are released in this process are able to move around the external circuit and do work. Electrolyte in flow batteries is stored externally to the cell and is pumped through the cell. It can be replaced and thus the battery can be "recharged" and any spent material reenergised.

Mihai Duduta et al. (*Adv. Energy Mater.*, 2011, 1, 511-516) report a semi-solid lithium-ion rechargeable flow battery. This flow battery consists of positive and negative electrodes composed of particles suspended in a carrier liquid. The particles flow in the cathodic or anodic compartments which are separated by ion-conducting membranes. The flowable cathode may comprise Li compounds such as: $LiCoO_2$, $LiFePO_4$, and $LiNi_{0.5}Mn_{1.5}O_4$, and the flowable anode may comprise compounds such as $Li_4Ti_5O_{12}$, graphite, and Si. The electrolyte may also comprise Ketjen black as a dispersed conductive phase. Energy is stored in the suspensions of the flowable cathode and anode and the transfer of charge to current collectors takes place via percolating networks of nanoscale conductors (e.g. Ketjen black).

Simone Monaco et al. (*J. Phys. Chem. Lett.*, 2013, 4, 1379-1382) found that oxygen electrode response in ionic liquids at high discharge currents is dominated by oxygen mass transport in ionic liquids. To solve this problem Simone Monaco et al. proposed to bubble oxygen into the electrolyte (N-butyl-N-methyl pyrrolidinium bis(trifluoromethanesulfonyl)imide ($PYR_{14}TFSI$):LiTFSI 9:1) which continuously circulated through the cathode compartment. A flow-cell fed with oxygen saturated ionic liquid electrolyte had a discharge capacity of up to 600 mAh $g^{-1}$ under discharge currents of 0.2 mA $cm^{-2}$, with a recharge efficiency of 92%.

Yun Guang Zhu et al. (*Chem. Commun.*, 2015, 51, 9451-9454) reported a flow lithium oxygen battery with soluble redox catalysts that comprises a lithium metal anode separated from a carbon felt cathode by a membrane; and a gas diffusion tank connected to the cathodic compartment by a pump. Electrolyte (such as lithium bis(trifluoromethane)sulfonimide in tetraethylene glycol dimethylether) with soluble redox catalysts is circulated between the gas diffusion tank and the cell. During the discharging process, oxygen flows into the gas diffusion tank, and is reduced to form $Li_2O_2$. This is then deposited on the porous matrix of the tank. The gas diffusion tank thus assists in preventing passivation and pore clogging of the cathode. The authors of the paper postulate that the capacity of the cell would be limited by the size of the gas diffusion tank.

Volker Presser et al. (*Adv. Energy Mater.*, 2012, 2, 895-902) report an electrochemical flow capacitor which functions by storing energy in an electric double layer of charged carbon particles. A flowable, semi-solid carbon-electrolyte mixture is employed as the active material for capacitance energy storage. When this electrolyte mixture is pumped between two polarised current collectors, an electric double layer forms at the surface of the carbon particles. The positively charged solid particles in the slurry attract negatively charged ions for charge balancing, and the negatively charged solid particles attract positively charged ions. Ion diffusion then occurs from one slurry electrode to the other through a membrane acting as an electrical insulator. The charged slurry can then be stored in reservoirs until the stored energy is needed.

Despite the advances in lithium batteries in recent years, there still exists a need for the production of lithium batteries with high discharge capacities, which are space efficient and inexpensive. Such batteries could be used in electric vehicles and in renewable energy plants.

SUMMARY OF INVENTION

The present disclosure provides a lithium oxygen battery comprising a semi-solid catholyte which comprises an electrolyte, dissolved oxygen and carbonaceous particles. The lithium oxygen battery may also comprise a lithium anode.

Preferably the electrolyte is non-aqueous. Preferably the catholyte is flowable.

Preferably the catholyte is saturated with oxygen.

Preferably the carbonaceous particles are insoluble in the catholyte. Preferably the carbonaceous particles are comprised of carbon, preferably conductive carbon black.

The lithium oxygen battery of the present disclosure may further comprise two electrical contacts, a separator and a porous cathode current collector. Preferably the porous cathode current collector is made of a material selected from carbon paper, reticulated vitreous carbon, reticulated vitreous carbon coated with conductive carbon black, mesoporous carbons, activated carbons, nanostructured carbons and combinations thereof.

The present disclosure also provides a semi-solid catholyte comprising an electrolyte, preferably non-aqueous, dissolved oxygen and carbonaceous particles. Preferably the catholyte is saturated with oxygen. Preferably the carbonaceous particles are insoluble in the catholyte. Preferably the carbonaceous particles are comprised of carbon, preferably conductive carbon black.

Another aspect of the present disclosure is the use of the lithium oxygen battery or the catholyte of the present disclosure in an electric vehicle.

A further aspect of the present disclosure is the use of the lithium oxygen battery of the present disclosure in stationary plants. The stationary plant may be selected from the group comprising renewable energy plants.

Also provided is an electric vehicle comprising the lithium oxygen battery or the catholyte of the present disclosure.

Also provided is a stationary plant comprising the lithium oxygen battery or the catholyte of the present disclosure.

The references described in the "background" section above differ from the lithium oxygen battery of the present disclosure in a number of ways. For example, the flow battery described in the publication by Mihai Duduta et al. is not a lithium oxygen flow battery and is not concerned with the oxygen redox reaction and the formation of discharge products which passivate the current collector and reduce the discharge capacity of the cathode. Furthermore, the Ketjen black particles present in the electrolyte assist in electron transfer from the active material particles to the current collectors, however, they do not provide a site for which an oxygen redox reaction can take place. The publication by Volker Presser et al. concerns a capacitor and not a battery or a lithium oxygen flow battery. The carbon particles employed in the electrolyte do not provide a site for an oxygen redox reaction to take place, but are used in the formation of an electric double layer. The work by Yun Guang Zhu et al. is on a flow lithium oxygen battery where the redox catalysts is solubilised in the catholyte. The catholyte is not semi-solid.

While multiple embodiments are disclosed, still other embodiments will become apparent to those skilled in the art from the following detailed description. As will be apparent, certain embodiments, as disclosed herein, are capable of modifications in various obvious aspects, all without departing from the invention. Accordingly, the drawings and detailed description are to be regarded as illustrative in nature and not restrictive.

BRIEF DESCRIPTION OF THE DRAWINGS

The following figures illustrate preferred embodiments of the subject matter disclosed herein. The claimed subject matter may be understood by reference to the following description taken in conjunction with the accompanying figures in which:

FIG. 8B shows the cell voltage and electrode potentials and current density of a semi-solid flow cell during 1 hour recharge steps from 0.9 mA$cm^{-2}$ to 0.05 mA$cm^{-2}$; a)=

$V_{cathode}$(RVCSP); b)=$V_{cell}$; c)=mAcm$^{-2}$; d)=$V_{anode}$; y$^1$=cell voltage or electrodic potential (V); y$^2$=Current density (mAcm$^{-2}$); x=Time (hours).

DETAILED DESCRIPTION

As described herein, the term "lithium oxygen battery" means a battery that uses oxidation of lithium at the anode and reduction of oxygen at the cathode to induce a current flow. A lithium oxygen battery may also be referred to as a "lithium air battery".

As described herein, the term "semi-solid catholyte" or "semi-solid flowable catholyte" refers to a liquid electrolyte having insoluble solid particles dispersed therein.

As described herein, the term "reticulated vitreous carbon" (RVC) means a foam of vitreous carbon, which is non-graphitic.

As described herein, the term "SP" refers to SuperP carbon which is conductive carbon black.

As described herein, the term "percolating network" refers to the solid particles in the catholyte which are able to conduct electrons.

As described herein, the term "oxygen redox reaction" refers to a chemical reaction which involves the reduction and oxidation of oxygen, i.e. the gain and loss of electrons, respectively.

As described herein, the term "carbonaceous particles" refers to particles comprising carbon.

One aspect of the present disclosure is a lithium oxygen battery. The lithium oxygen battery comprises a cell through which a semi-solid catholyte flows. The battery may comprise a means for circulating the catholyte in the battery such as a pump, an oxygen or air inlet and two electrical contacts. In a preferred embodiment, one electrical contact is connected to the positive terminal of the battery and the other electrical contact is connected to the negative terminal of the battery. In one embodiment, the cell of the lithium oxygen battery comprises a lithium anode, a separator, and a porous cathode current collector, through which the catholyte flows. The catholyte may be directed into the cell using any suitable means, preferably by using a pump.

Figure 1:
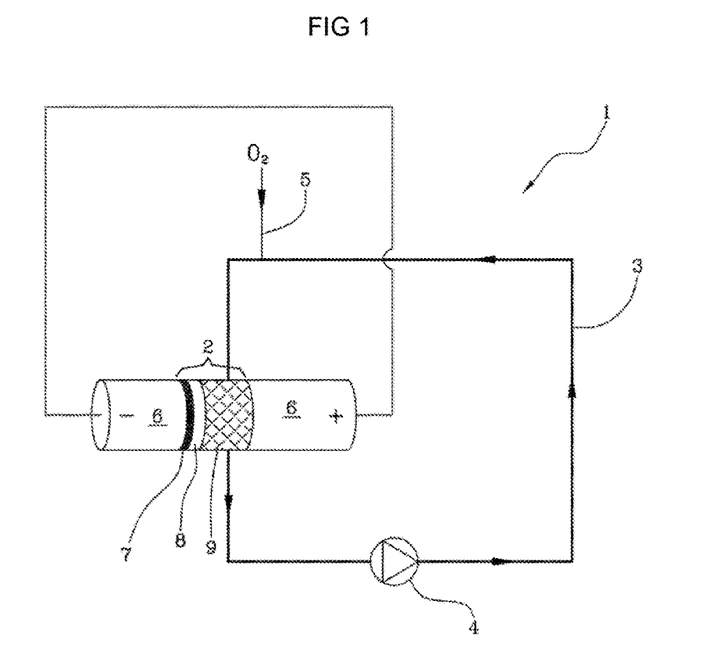
FIG. 1 shows a schematic representation of an embodiment of the present disclosure that is a lithium oxygen battery with a non-aqueous, semi-solid flowable catholyte.

A preferred embodiment of the lithium oxygen battery 1 of the present disclosure is illustrated in FIG. 1. The preferred embodiment comprises a cell 2 through which a semi-solid catholyte 3 flows. The battery may comprise a means for circulating the catholyte in the battery such as a pump 4, an oxygen or air inlet 5 and two electrical contacts 6.

In a preferred embodiment, the cell 2 comprises a lithium anode 7, a separator 8, and a porous cathode current collector 9 through which the catholyte flows. The semi-solid catholyte 3 may be directed into the cell 2 using any suitable means, preferably by using a pump 4.

In a preferred embodiment, the porous cathode current collector is comprised of porous carbon. The porous cathode current collector is preferably coated with carbon particles, preferably SP carbon.

Preferably the porous cathode current collector is made of a material selected from carbon paper, reticulated vitreous carbon, reticulated vitreous carbon coated with conductive carbon black, mesoporous carbons, activated carbons, nanostructured carbons and combinations thereof.

Figure 2:
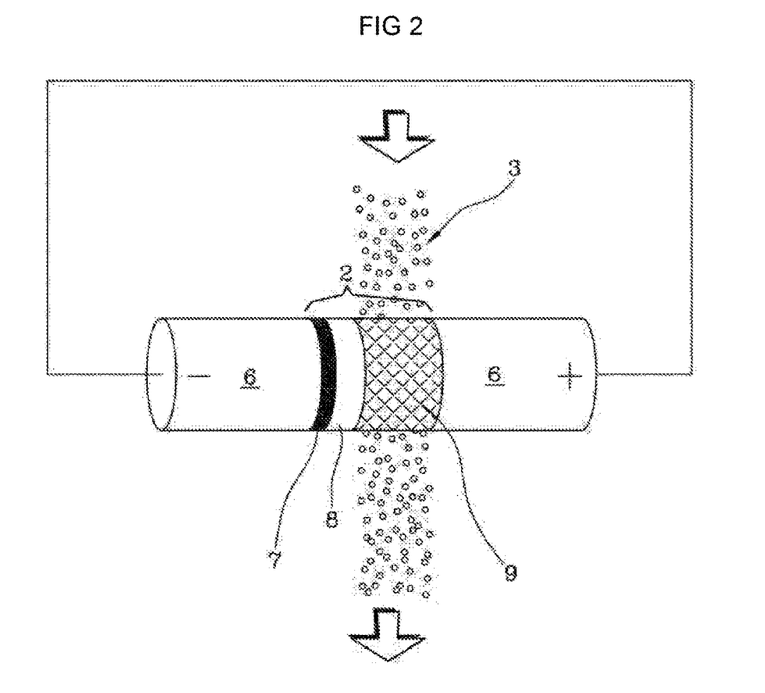
FIG. 2 shows a schematic representation of an embodiment of the present disclosure that shows the cell of the lithium oxygen battery together with the electrical contacts of FIG. 1.

In particular, the porous cathode current collector can be comprised of reticulated vitreous carbon (RVC), preferably coated with SP carbon (RVCSP) (FIGS. 1 and 2). The anode is attached to the negative terminal of the battery and is essentially comprised of lithium metal.

The lithium anode is preferably a lithium metal foil. Preferably the lithium metal anode comprises lithium metal in a purity of between 99% and 99.9%. The lithium anode may be coated with a protective layer which plays the key role of barrier to avoid the O$_2$ crossover from the cathode to the anode and improves the anode/electrolyte interfacial properties. The coating may be comprised of ceramic, polymer membranes and mixtures thereof.

The separator may be comprised of a material selected from the group comprising fiberglass, ceramic and polymer membranes.

The catholyte of the present invention comprises a non-aqueous electrolyte, carbonaceous particles and dissolved oxygen. Preferably the carbonaceous particles form a suspension in the electrolyte.

The electrolyte may be selected from the group comprising TEGDME, LiTFSI, ionic liquids, dimethyl sulfoxide, and mixtures thereof.

The carbonaceous particles are preferably comprised of a carbonaceous material and are able to flow in the catholyte. Preferably the carbonaceous particles are porous. Preferably the carbonaceous particles have a porosity ≥0.5 cm$^3$/g. In a preferred embodiment, the carbonaceous particles have a surface area of between 50 m$^2$/g and 2000 m$^2$/g, preferably of between 700 m$^2$/g and 1000 m$^2$/g. Preferably the carbonaceous particles are comprised of one or more materials selected from carbon, SuperP carbon, carbon blacks, mesoporous carbons, activated carbons, nanostructured carbons (graphene, nanotubes etc.) and mixtures thereof.

The carbonaceous particles may be present in the catholyte in a % w/w of between 1 and 50% w/w, preferably between 2 and 20% w/w.

The catholyte is enriched with oxygen which may be introduced into the lithium oxygen battery through at least one oxygen inlet. Preferably the oxygen is continuously dissolved in the electrolyte. Preferably the oxygen is introduced into the catholyte so that the catholyte flow first intercepts the oxygen inlet before entering the cell. In one embodiment the catholyte may contain between $1 \times 10^{-3}$ and $20 \times 10^{-3}$ mol/L of dissolved oxygen. Preferably the catholyte is saturated with oxygen.

The use of oxygen as a redox species in the lithium oxygen flow battery avoids the solubility issues that limit conventional redox-flow battery operation.

In a preferred embodiment, when the lithium oxygen battery is in use, the catholyte is continuously circulated in the lithium oxygen battery in a closed circuit. As no additional external containers are required to house the catholyte when the battery is in use, the battery is space efficient.

The catholyte in the lithium oxygen battery of the present disclosure is circulated, for example, at a flow rate of between 100 and 250 ml/min preferably of between 150 and 200 ml/min. The pump rate can be for example between 100 and 300 rpm, preferably between 170 and 230 rpm. The flow rate may vary in relation to the discharge current, electrode and cell core size.

The catholyte may be circulated continuously or it may be circulated at intervals. Preferably the catholyte is circulated continuously.

The lithium oxygen battery of the present disclosure preferably has a discharge capacity (>500 mAh/g of catholyte total weight) of >100 mAh $cm^{-2}$, preferably >170 mAh $cm^{-2}$.

The lithium oxygen battery of the present disclosure preferably can be discharged at current densities of between 0.05 mA $cm^{-2}$ and 4 mA $cm^{-2}$, preferably of >2 mA $cm^{-2}$.

The lithium oxygen battery of the present disclosure preferably has a power level of between 5 and 25 $mWcm^{-2}$, preferably of between 10 and 25 $mWcm^{-2}$, more preferably of between 20 and 25 $mWcm^{-2}$.

The lithium oxygen battery of the present disclosure may operate at high voltages of 2.5-3.0V.

The lithium oxygen battery of the present disclosure has a projected system-level energy density of >500 Wh/L, >500 Wh/kg which is 5-10 times higher than conventional lithium-ion batteries which is thought to be due to the low volume and weight impact of inactive materials.

Together with the afore-mentioned properties, the lithium oxygen battery of the present disclosure, is cost-effective and easy to manufacture with installed capacity cost of <200 €/kWh, which is lower than that of marketed lithium-ion batteries due to the reduction or absence of precious materials.

Without wishing to be bound to any particular theory, the reason for the high discharge capacity of the lithium oxygen battery of the present disclosure is thought to be due to percolating network of the catholyte carbon particles, which are highly conducting and ensure an efficient transfer of electrons to the porous cathode current collector. Furthermore, as the oxygen redox reaction occurs on the flowable carbonaceous particles, passivating species such as lithium oxides are removed far from the porous cathode current collector.

Another factor which is believed to contribute to the high discharge capacities of the battery of the present invention is the occurrence of the oxygen redox reaction on the carbonaceous particles. This avoids the buildup of lithium oxide species such as lithium peroxide and lithium superoxide, which occurs at fixed cathodes, thus reducing their discharge capacities.

The lithium oxygen battery of the present invention can be employed in any application which requires the use of a battery. The lithium oxygen/air batteries of the present disclosure may also be used to power vehicles, specifically electric vehicles, and in the energy storage/conversion of stationary, like in renewable energy plants. The electric vehicles may include automobiles, motorbikes, lorries, scooters, and bicycles.

A further aspect of the present disclosure is a semi-solid catholyte. The semi-solid catholyte preferably comprises solid carbonaceous particles and an electrolyte. Preferably the semi-solid catholyte also comprises dissolved oxygen. Preferably the carbonaceous particles are not soluble in the electrolyte. Preferably the carbonaceous particles form a suspension in the electrolyte.

The electrolyte may be selected from the group comprising TEGDME, LiTFSI, ionic liquids, dimethyl sulfoxide, and mixtures thereof.

The carbonaceous particles are preferably comprised of a carbonaceous material and are able to flow in the catholyte. Preferably the carbonaceous particles are porous, in particular they are made of porous carbon, with a porosity ≥0.5 $cm^3/g$. In a preferred embodiment, the carbonaceous particles have a surface area of between 50 $m^2/g$ and 2000 $m^2/g$, preferably of between 700 $m^2/g$ and 1000 $m^2/g$. Preferably the carbonaceous particles are comprised of one or more materials selected from carbon, SuperP carbon, carbon blacks, mesoporous carbons, activated carbons, nanostructured carbons (graphene, nanotubes etc.) and mixtures thereof.

The carbonaceous particles may be present in the catholyte in a % w/w of between 1 and 50% w/w, preferably between 2 and 20% w/w.

The catholyte may contain between $1\times10^{-3}$ and $20\times10^{-3}$ mol/L of dissolved oxygen. Preferably the catholyte is saturated with oxygen.

The present disclosure also refers to a stationary plant comprising the lithium oxygen battery described herein.

The present disclosure also refers to a stationary plant comprising the semi-solid, non-aqueous catholyte described herein.

The stationary plant may be selected from the group of renewable energy plants.

The present disclosure also refers to an electric vehicle comprising the lithium oxygen battery described herein.

The present disclosure also refers to an electric vehicle comprising the semi-solid, non-aqueous catholyte described herein.

The electric vehicle may be selected from the group comprising automobiles, motorbikes, lorries, scooters and bicycles.

EXAMPLES

Materials Used:

The electrolyte used was a solution of tetraethylene glycol dimethyl ether (Sigma-Aldrich, TEGDME, ≥99.0%): bis (trifluoromethane)sulfonimide lithium salt (Sigma-Aldrich, LiTFSI, ≥99.0%) 9:1 molar ratio, which was prepared and stored in glove-box (MBraun, Ar atmosphere, $H_2O$ and $O_2$<1 ppm). Before use, the water content of the solution was checked by Karl-Fishser titration (756/831 KF Coulometer-Metrohm) and was found to be 160 ppm.

The catholyte was prepared in a glove-box by adding Super-P (SP, 2% w/w, Erachem Comilog N.V., BET 65.5 $m^2/g$) to the electrolyte. Prior to addition to the electrolyte, Super-P was dried under vacuum at 120° C. overnight (rotary evaporation).

The porous cathode current collectors used were Carbon Paper (CP, Spectracarb 2050, Spectracorp, thickness 40 mils, density 0.64 g/cc) and Reticulated Vitreous Carbon (RVC, ERG Aerospace Corporation, foam, 3% nominal density, 100 PPI) which were dried overnight under vacuum at 120° C. before use. The porous cathode current collector RVC was coated with SP carbon powder by drop casting 95% SP-5% Polyvinylidene fluoride (PVdF, Kynar HSV900) in N-methyl pyrrolidone inks (28 mg of SP per mL), followed by heating at 60° C. overnight. The label RVCSP indicates the SP-coated RVC electrode.

The anode was composed of lithium foil (>99%).

Methods of Measurement:

The oxygen redox reaction was investigated by galvanostatic measurements in a conventional, thermostated, 5 mL cell at CP (A=0.45 cm$^2$) and RVCSP (A=0.6 cm$^2$) electrodes and in a semi-flow cell with RVCSP (0.385 cm$^2$ RVCSP geometric area, 30 mL of catholyte). The reference electrode was a silver wire in 6·10$^{-2}$ M AgTFSI in PYR$_{14}$TFSI; the electrode potentials were checked vs Li and are reported vs. the Li$^+$/Li couple.

The electrochemical tests were performed with a PerkinElmer VSP multichannel potentiostat/galvanostat with electrochemical impedance spectroscopy (EIS) module. EIS was performed in the 1 kHz-100 mHz frequency range with 5 mV AC perturbation and by taking 10 points/decade. The electrolyte and catholyte were saturated with O$_2$ (g) (>99.999%, SIAD). Circulation of the catholyte through the semi-flow cell was achieved by a Watson-Marlow 1205/DV peristaltic pump operating at 200 rpm. The flow Li/O$_2$ battery was assembled in dry box. A cross-shaped Teflon cell (BOLA) with 2 fiber glass separators (Whatman GF/F) and 4 stacked Lithium disks (>99%, 3.8.10$^{-2}$ g) was used.

X-ray diffraction measurements (XRD) were performed with PANalytical X'Pert PRO powder diffractometer equipped with a X'Celerator detector (CuKα radiation, λ=1.5406 Å, 40 mA, 40 kV), radiation source and Ni filter by continuous scanning mode (0.04°2θ s$^{-1}$ scan rate, 0.05°2θ step size).

FTIR analyses were carried by a Bruker Optics Tensor 27 apparatus (2 cm$^{-1}$ resolution) TEM and SEM images were obtained by using a Philips CM100 (accelerating voltage 80 kV) and a Zeiss EVO 50, respectively.

Example 1. Preliminary Study

An experiment was performed in a 5 mL conventional electrochemical cell using electrolyte (TEGDME:LiTFSI 9:1 mol, LiTFSI concentration ca. 0.5 mol/L) or catholyte (TEGDME:LiTFSI 9:1 mol, 2% wt. SP). The electrolyte or catholyte were continuously fed with oxygen and were mechanically stirred to simulate flow cathode operative conditions. The porous cathode current collectors used were CP or RVCSP. A lithium counter electrode (separated by the cathode compartment via a porous frit) and an Ag-based reference electrode were used. The lithium counter electrode was a lithium foil (ca. 1×5 cm$^2$) which was rolled around a glass rod and featured an area which was 10 times higher than that of the working electrode. Such approach was used for the basic studies in order to not limit working electrode operation.

Figure 3A:
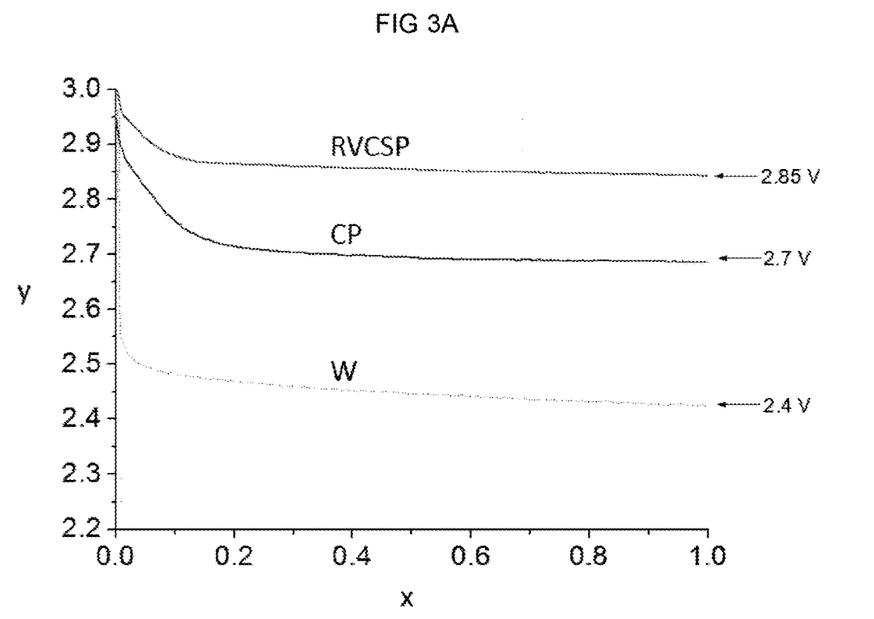
FIG. 3A shows the comparison of the potentials of CP (0.45 $cm^2$) and RVCSP (0.6 $cm^2$, 3 mg $cm^{-2}$ of SP) current collectors during galvanostatic discharges at 0.25 mA/$cm^2$ in stirred, $O_2$-saturated catholyte. The curves marked RVCSP and CP show the discharge potentials of current collectors RVCSP and CP, respectively, when SP particles (0.1 g) are dispersed in the electrolyte. W represents the discharge potential of the CP current collector in stirred $O_2$-saturated TEGDME-LiTFSI electrolyte without dispersed SP particles. y=cathode potential (V vs. $Li^+$/Li); x=time (hours).

The results reported in FIG. 3 show that under galvanostatic discharge at 0.25 mA/cm$^2$ when the catholyte containing SP (Super-P) was used in the cell, the CP discharge potential increased by 300 mV, when compared to the electrolyte without SP (FIG. 3A). Furthermore, by coating the RVC current collector with SP, and thus increasing its specific surface area, the electrode potential increased up to 2.85 vs. Li$^+$/Li at 0.25 mA/cm$^2$.

Figure 3B:
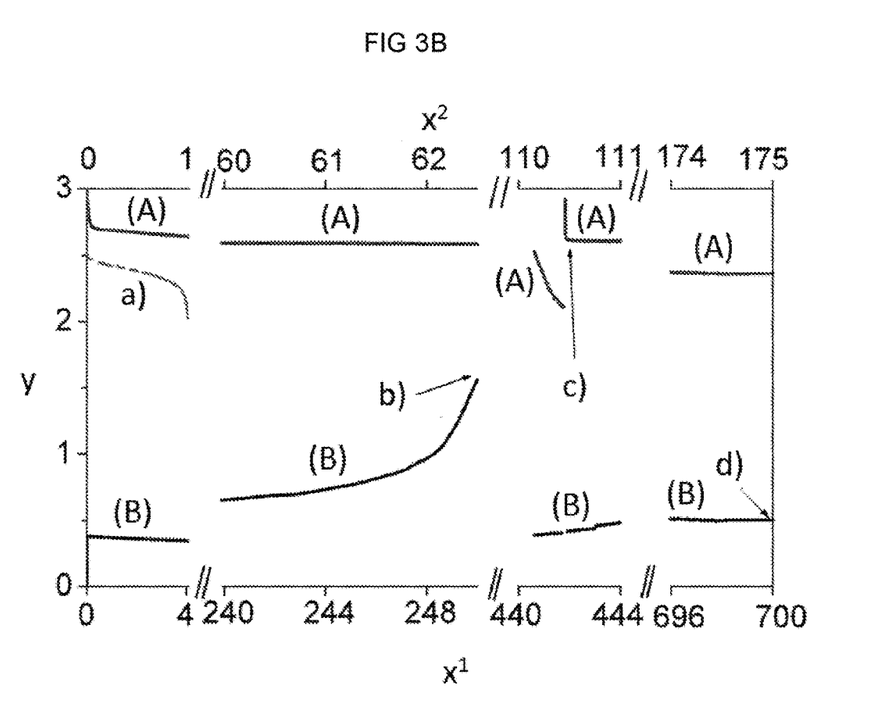
FIG. 3B shows the CP (0.45 $cm^2$) current collector (A) and the lithium electrode response (B) in catholyte with SP particles (0.1 g), over long-term discharge in conventional electrochemical cell with $O_2$-saturated, stirred catholyte (ca. 5 mL). y=electrodic potential (V vs. $Li^+$/Li); $x^1$=time (hours); $x^2$=capacity (mAh$cm^{-2}$). a)=discharge time of the CP current collector in electrolyte without SP; b) replacement of lithium counter electrode with a fresh one after 11 days; c) substitution of the CP current collector with a fresh one after 19 days; d)=29 days.

The CP and lithium response over long-term discharge was also measured. FIG. 3B shows that the substitution of the conventional electrolyte with the semi-solid catholyte dramatically increases the discharge capacity of the Li/O$_2$ cathode. When SP was added to the electrolyte, the discharge time increased from 4 hours to 11 days. The discharge was limited by lithium consumption as demonstrated by the fast lithium potential rising after 250 h. Replacing the lithium counter electrode with a fresh one enabled the discharge to be extended over 19 days and to reach a discharge capacity of 110 mAh/cm$^2$ corresponding to 500 mAh/g of total SP dispersed in the catholyte (0.1 g) and to a practical energy density of 300 mWh/cm$^2$.

Figure 4A:
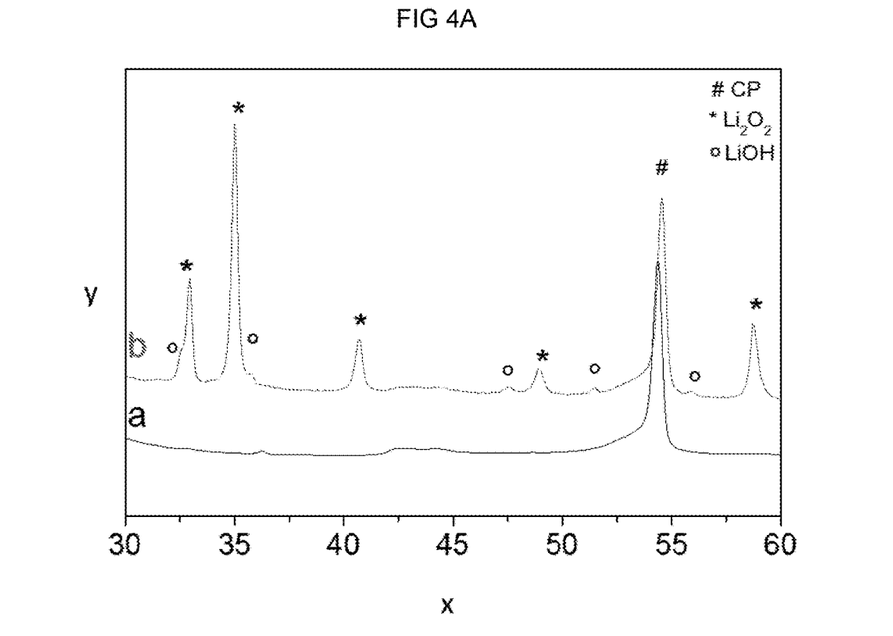
FIG. 4A shows the XRD patterns of the CP current collector before and after 19 day discharge at 0.25 mA/$cm^2$ in conventional electrochemical cell with $O_2$-saturated, stirred catholyte. The patterns of CP, $Li_2O_2$ and LiOH are highlighted with #, * and °, respectively. y=intensity (a.u.), x=2θ (degrees); a=fresh CP; b=CP after 19 day discharge.
Figure 4B:
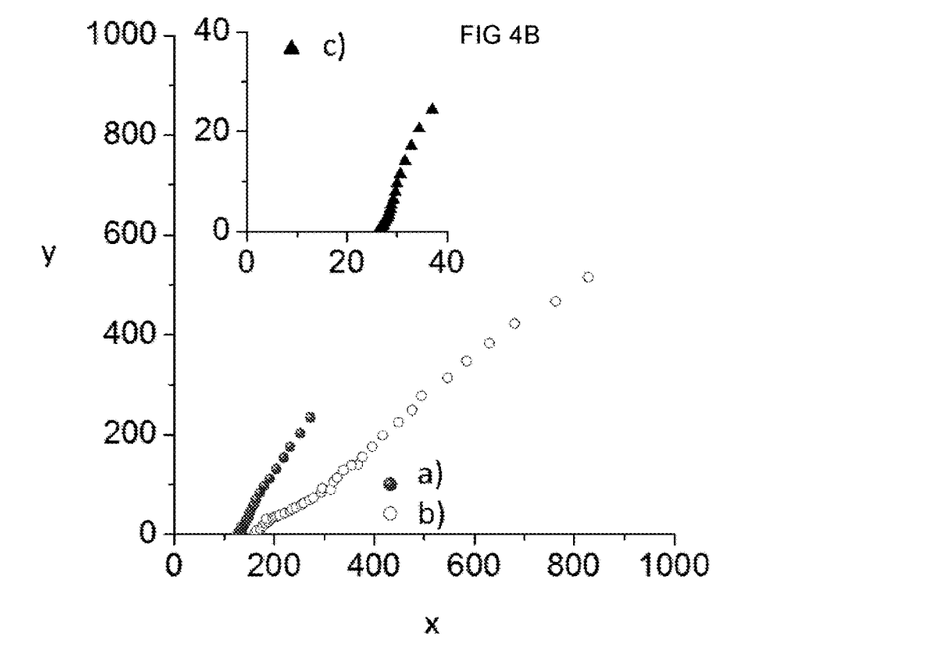
FIG. 4B shows the comparison of the Nyquist plots of the CP current collector after 19 day-discharge at 0.25 mA/$cm^2$ in conventional electrochemical cell with $O_2$-saturated, stirred catholyte and of a fresh CP current collector in the same catholyte used for the 19 day-discharge. The inset reports the Nyquist plot for a fresh RVCSP electrode in conventional, stirred cell. (1 kHz-100 mHz). y=−Zim (Ohm $cm^2$); y=Zr (Ohm $cm^2$); a)=fresh CP; b)=CP after 19 day discharge; c)=fresh RVCSP.

After 19 days, the CP current collector was found to have formed a passivation layer which was mainly composed of Li$_2$O$_2$, although traces of LiOH were also present. This layer was detected by XRD analysis (FIG. 4A) and caused an increase in electrode impedance (FIG. 4B). The catholyte was not affected by the prolonged discharge. Indeed, substitution of the CP current collector with a fresh one allowed O$_2$ reduction to be carried out in the same catholyte over an additional 10 days (700 h total discharge time) and to achieve a discharge capacity of 175 mAh/cm$^2$. On the basis of the CP area (0.45 cm$^2$) and SP content (ca. 0.1 g) in the catholyte (ca. 5 mL) the specific capacity is ca 800 mAh/g of total SP. Given that the average cathode potential is 2.7 V vs. Li$^+$/Li, the energy density approaches 500 mWh/cm$^2$.

Figure 5A:
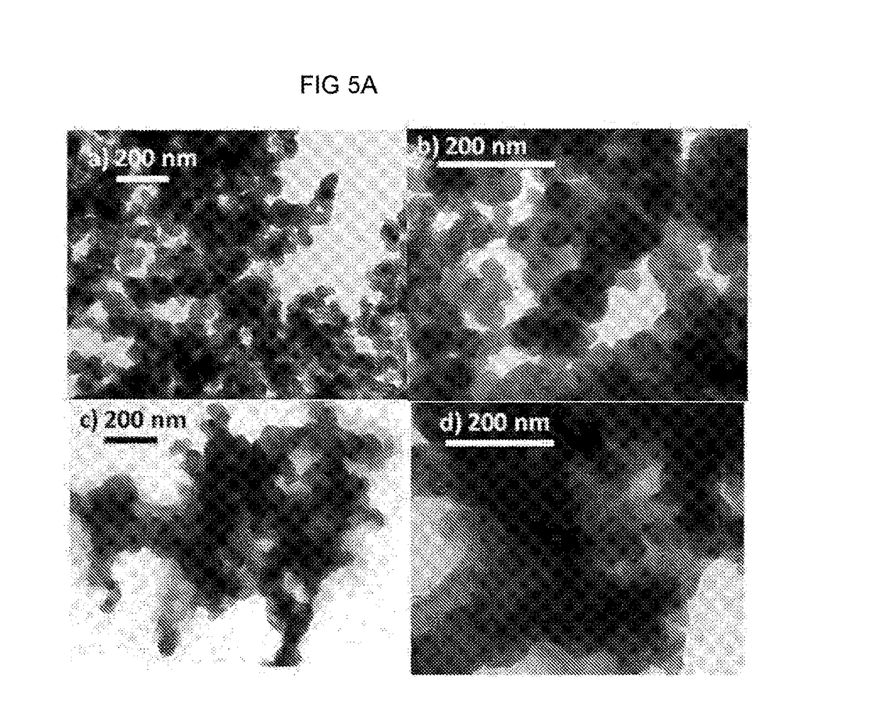
FIG. 5A shows TEM images of the catholyte before (a, b) and after (c, d) 700 h-discharge at 0.25 mA/$cm^2$ in conventional, stirred electrochemical cell.
Figure 5B:
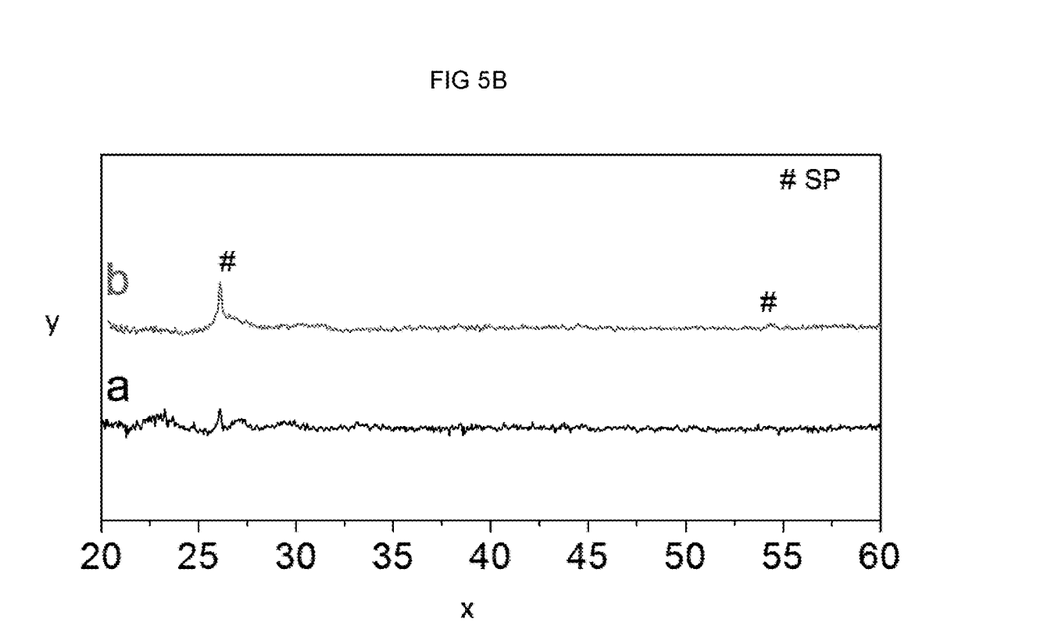
FIG. 5B XRD shows spectra of the catholyte before (a) and after (b) 700 h-discharge at 0.25 mA/$cm^2$ in conventional, stirred electrochemical cell. The pattern of SP is highlighted with $^{\#}$. y=intensity (a.u.), x=2θ (degrees).
Figure 6:
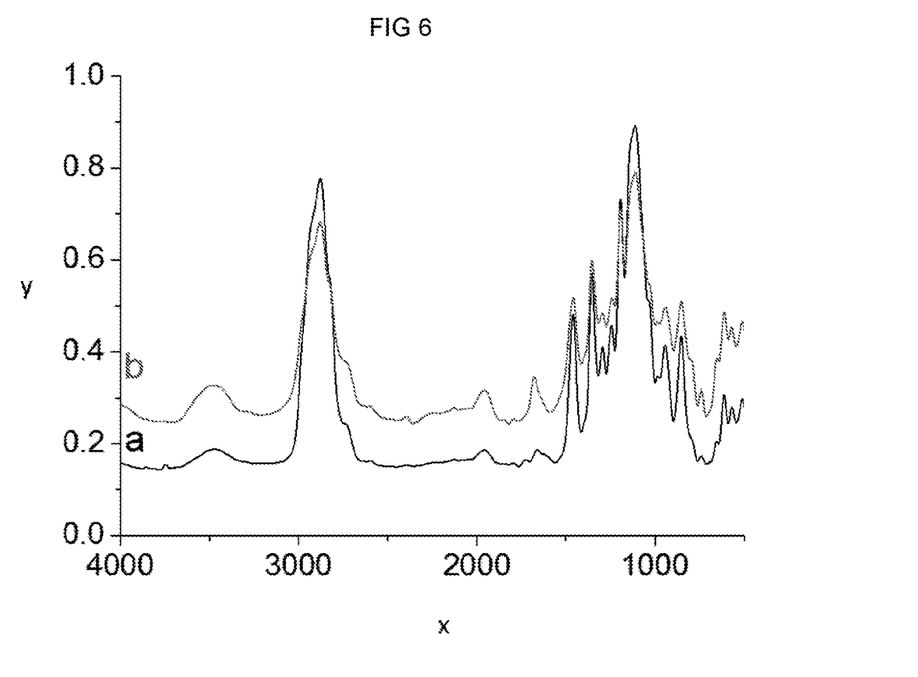
FIG. 6 shows FTIR spectra of the catholyte before (a) and after (b) 700 h-discharge at 0.25 mA/$cm^2$ in conventional, stirred electrochemical cell. y=absorbance; x=wavenumber ($cm^{-1}$).

Following the additional 11 days, the catholyte was characterized by TEM (FIG. 5A), XRD (FIG. 5B), and FTIR (FIG. 6). The TEM images indicated that a thin (<50 nm) passivating layer was formed on the SP surface, thus demonstrating that ORR was taking place at the flowing catholyte particles. XRD analyses did not reveal crystalline Li$_2$O$_2$ in the catholyte presumably because these particles were highly dispersed in the carbonaceous component of the catholyte. The FTIR spectrum of the catholyte collected after 700 h discharge was similar to that of the catholyte before discharge, with a small increase of the absorption band intensity at 3500 cm$^{-1}$ and 1600 cm$^{-1}$. Such signals can be related to alcoholic moieties originating from electrolyte decomposition and/or to moisture entering the cell after long operation (FIG. 6).

Example 2. Lithium Oxygen Battery

Figure 7:
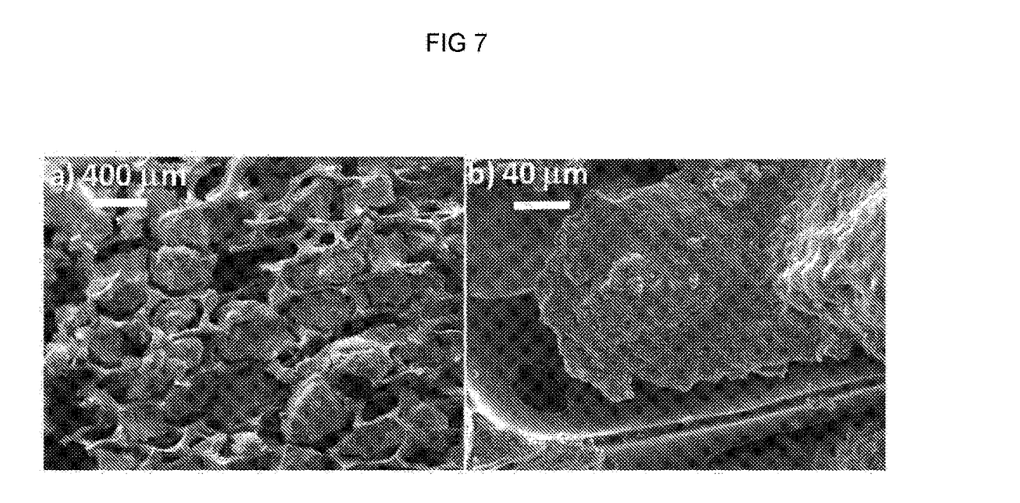
FIG. 7 shows SEM images of the RVCSP current collector, before use (a-b).

A macroporous RVC current collector was coated with SP (SEM image, FIG. 7) (0.385 cm$^2$, 7 mg cm$^{-2}$ of SP). The RVCSP current collector was used to assemble the semi-solid, flow Li/O$_2$ cell which is schematized in FIGS. 1 and 2. The cell core constituted a lithium metal anode and a RVCSP current collector separated by a fibreglass membrane. The catholyte was pumped through the cell by a peristaltic pump while being continuously enriched with O$_2$ (g). For basic studies, an additional reference electrode which intercepted the catholyte flow was used (not reported in FIGS. 1 and 2).

Figure 8A:
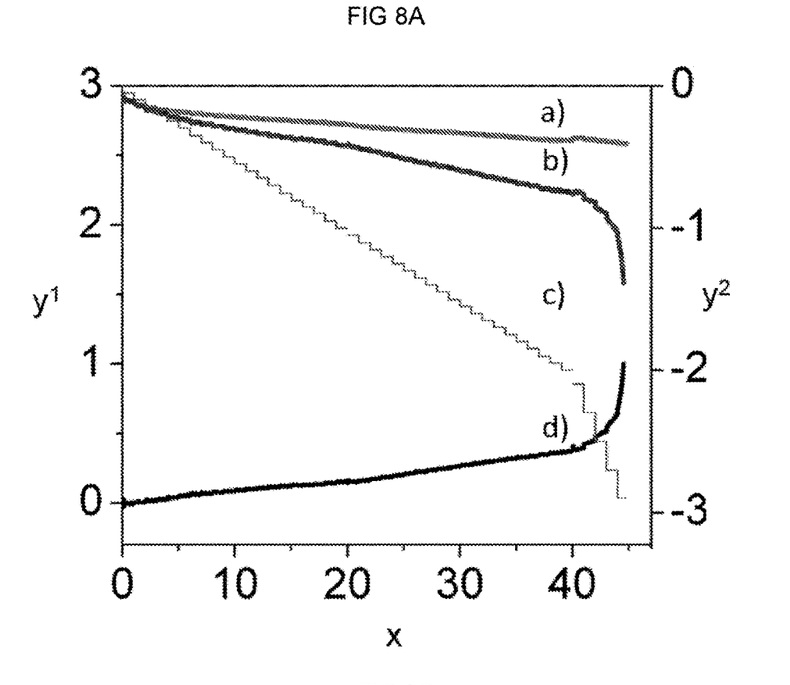
FIG. 8A shows the cell voltage and electrode potentials and current density of a semi-solid flow cell during 1 hour discharge steps from 0.05 mA$cm^{-2}$ up to 4 mA$cm^{-2}$; a)=$V_{cathode}$(RVCSP); b)=$V_{cell}$; c)=mA $cm^{-2}$; d)=$V_{anode}$; $y^1$=cell voltage or electrode potential (V); $y^2$=Current density (mA$cm^{-2}$); x=Time (hours).

Polarization tests were carried out on the prototype consisting in the repetition of 1 hour discharge steps at different current densities from 0.05 mA cm$^{-2}$ up to 4 mA cm$^{-2}$. The sequence was stopped when the cathode potential was lower than 2 V vs. Li$^+$/Li or the anode potential was higher than 1 V vs. Li$^+$/Li. The pump rate was 200 rpm which corresponded to a catholyte flow of approximately 170 mL/min. FIG. 8A shows the electrode potentials and cell voltage trends during the consecutive steps. Notably, the cathode showed a high potential (V$_{cathode}$) of 2.90 V vs Li$^+$/Li at 0.05 mA/cm$^2$ which decreased by only 10% when the current was increased up to 3 mA/cm$^2$. At 0.05 mA/cm$^2$ the cell voltage (V$_{cell}$) was 2.9 V. The total discharge capacity calculated by the integration of the current over time of the different steps was 50 mAh/cm$^2$. FIG. 8A shows that the cell performance at the longest times and highest currents was affected by the lithium anode. Lithium overpotential reached 1V after 40 h discharge and currents >2.5 mA/cm$^2$ due to lithium depletion.

Figure 8B:
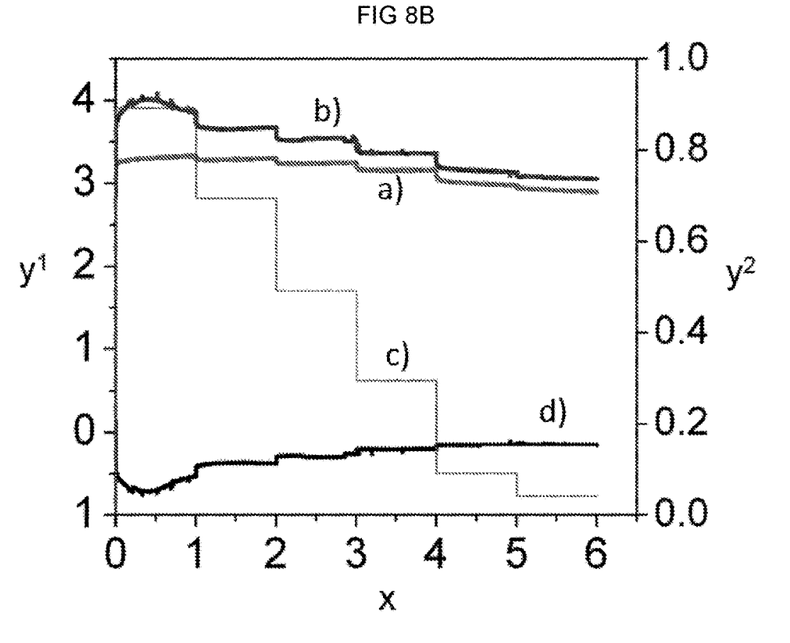

To avoid lithium depletion, flow cell rechargeability after the previous discharge sequence was studied by consecutive, 1 hour recharge steps at low currents, from 0.9 mA/cm$^2$ to 0.05 mA/cm$^2$ (FIG. 8B). The recharge cell voltages decreased when the current density was lowered and ranged between 3.85 V and 3.05 V, which correspond to cathode potentials of 3.30 V vs Li$^+$/Li and 2.90 V vs Li$^+$/Li. This leads to an exceptionally low cell recharge overvoltage of 150 mV at 0.05 mA cm$^{-2}$, which increases up to 950 mV at 0.9 mA cm$^{-2}$. At the highest current, $V_{cathode}$ is 3.3 V vs Li$^+$/Li, which corresponds to a low cathode recharge overpotential of 400 mV. The cell over voltage and electrode overpotentials are calculated as difference between the cell voltage or electrode potential during recharge and the cell voltage or electrode potential exhibited in open circuit conditions.

Figure 9A:
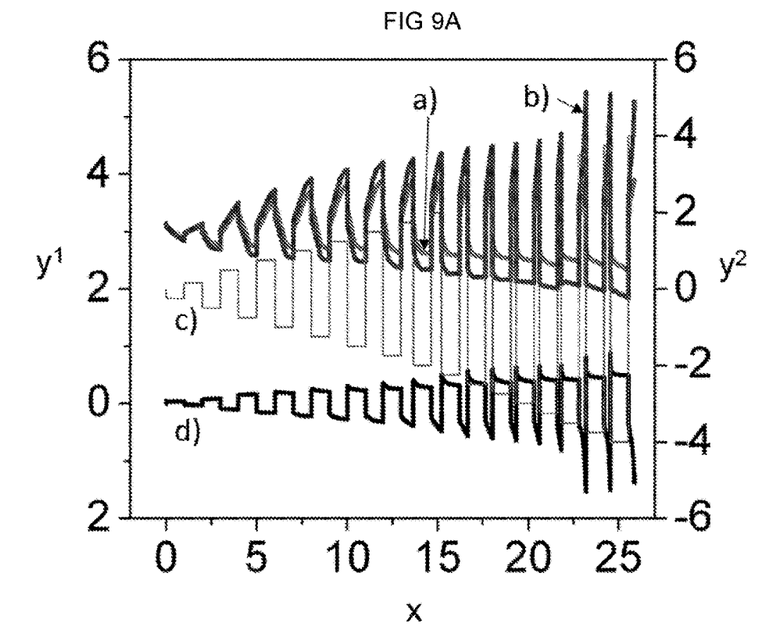
FIG. 9A shows the cell voltage and electrode potentials and current density of a semi-solid flow cell during 1 hour discharge and recharge steps from 0.05 mAcm$^{-2}$ up to 4 mAcm$^{-2}$; a)=$V_{cathode}$(RVCSP); b)=$V_{cell}$; c)=mA cm$^{-2}$; d)=$V_{anode}$; y$^1$=cell voltage or electrodic potential (V); y$^2$=Current density (mAcm$^{-2}$); x=Time (hours).

The rechargeability of the cell was further investigated by the repetition of 1 hour discharge and recharge steps at different current densities varying from 0.05 mA cm$^{-2}$ to 4 mA cm$^{-2}$. The discharge was limited by setting a cathode potential cut-off of 2 V vs Li$^+$/Li and the charge was limited by a cathode potential cut-off of 3.7 V vs Li$^+$/Li. The recharge cut-off was set to prevent electrolyte oxidative degradation. The results are reported in FIG. 9A. It was found that reducing the steps and the periodical recharging of the cell helped to circumvent lithium depletion phenomena.

Figure 9B:
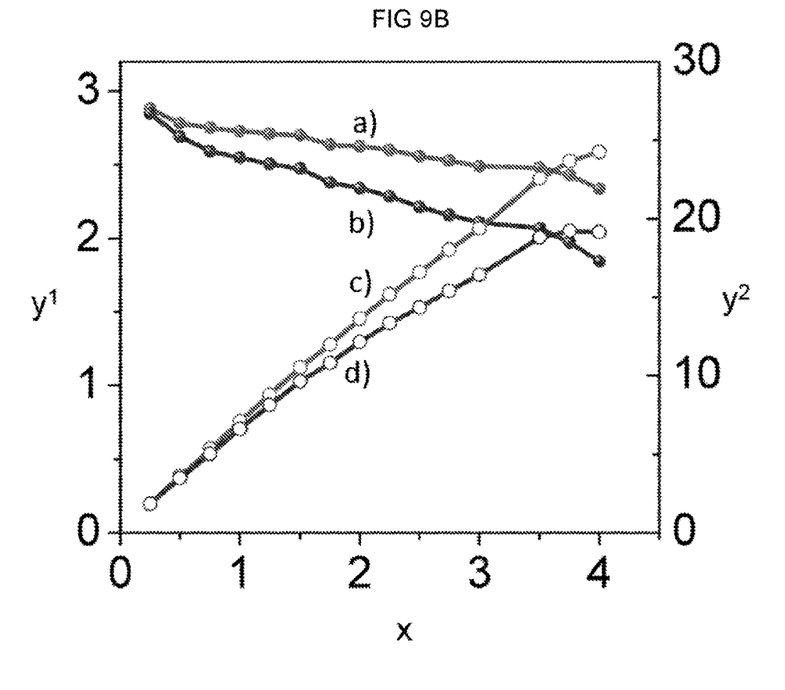
FIG. 9B shows cell and cathode discharge polarization curves of a semi-solid flow cell; a)=$V_{cathode}$; b)=$V_{cell}$; =$P_{cathode}$; d)=$P_{cell}$; y$^1$=$V_{cell}$ or $V_{cath}$ (V); y$^2$=Power density (mWcm$^{-2}$); x=Current density (mAcm$^{-2}$).

Using this approach, it was feasible to achieve up to 4 mAcm$^{-2}$. FIG. 9B shows the discharge polarization curves of the prototype in terms of $V_{cell}$ and cell power density ($P_{cell}$=i×$V_{cell}$) and of $V_{cathode}$ and cathode power density ($P_{cathode}$=i×$V_{cathode}$). Power levels of 25 mW cm$^{-2}$ were observed corresponding to specific power of approximately 3 kW kg$^{-1}$ of SP deposited on the RVC current collector which featured a geometric area of 0.385 cm$^2$ and an SP loading of 7 mg cm$^{-2}$. Given that 30 mL of catholyte was used, the power normalized to the total SP content (0.6 g) is 16 W kg$^{-1}$.

The cell discharge voltage was shaped by cathode and anode potential losses. The cathode potential does not significantly change up to 3 mA/cm$^2$. For higher currents, diffusion limitation caused a 20% cathode potential drop and $P_{cathode}$ reached a maximum value. Furthermore, the lithium anode discharge over potential is notable even at low currents and it mainly contributes to the cell voltage drop even for currents lower than 3 mA/cm$^2$.

Figure 10:
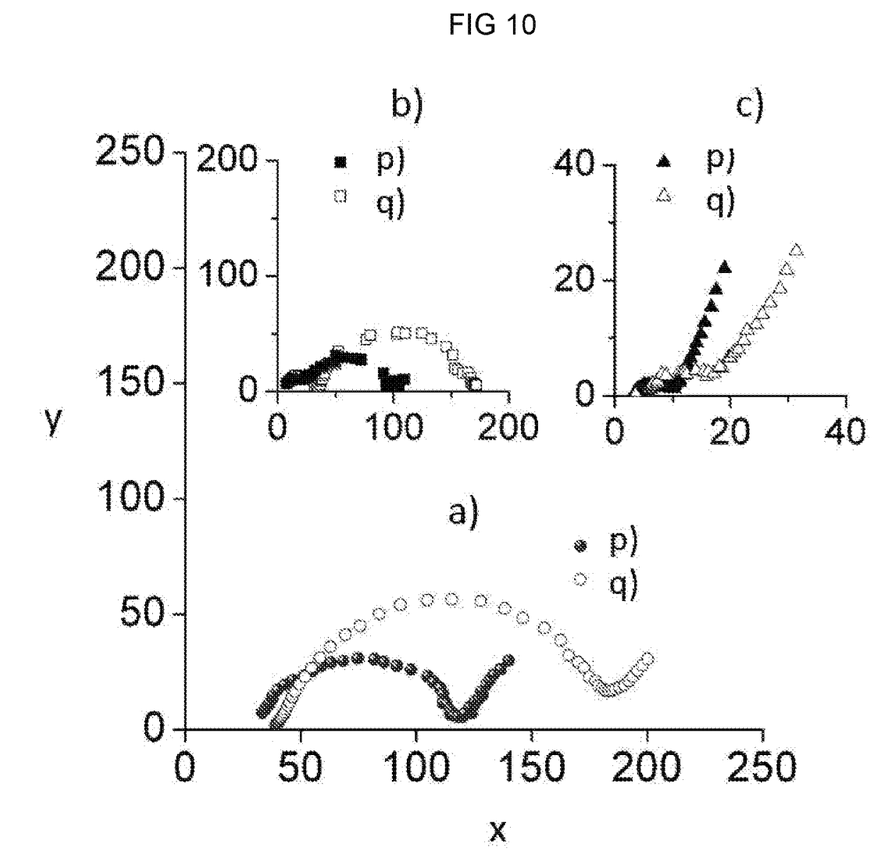
FIG. 10 shows the Comparison of the Nyquist plots of the semi-solid flow Li/O$_2$ cell (a)) before and after repeated 1 h-discharge and recharge steps at different current densities from 0.05 mA cm$^{-2}$ up to 4 mA cm$^{-2}$ (2-electrode mode, 10 kHz-100 mHz). The inset reports the lithium anode (b)) and RVCSP current collector (c)) Nyquist plots recorded in 3-electrode mode p)=initial; and q)=after cycling. y=$-Z_{im}$ (Ohm cm$^2$); y=$Z_{re}$(Ohm cm$^2$)

The Nyquist plots shown in FIG. 10 demonstrate that the lithium anode is the electrode that mainly contributes to the total cell impedance and to the cell impedance increase after cycling. The Nyquist plot of the lithium anode is dominated by a semicircle, which is ascribed to SEI (solid electrolyte interface), with a real axis intercept at low frequency of 100 Ωcm$^2$, which increases up to 170 Ωcm$^2$ after cycling. These data have to be compared with the initial and final cell impedances of 120 Ωcm$^2$ and 180 Ωcm$^2$. The lithium SEI could be improved by optimizing cell assembly. Indeed, lithium was not coated by any protective layer and was separated from the cathode only by a fibreglass separator.

The RVCSP impedance slightly worsens because diffusion-related processes become more sluggish, as in the case of CP electrodes tested in conventional stirred cells.

The invention claimed is:

1. A lithium oxygen battery comprising a lithium anode and a non-aqueous semi-solid flowable catholyte, said non-aqueous semi-solid flowable catholyte comprising an electrolyte, dissolved oxygen and carbonaceous particles.

2. The lithium oxygen battery of claim 1, wherein the electrolyte is selected from the group comprising TEGDME, LiTFSI, ionic liquids, dimethyl sulfoxide, and mixtures thereof.

3. The lithium oxygen battery of claim 1, wherein the catholyte contains between 1×10$^{-3}$ and 20×10$^{-3}$ mol/L of dissolved oxygen.

4. The lithium oxygen battery of claim 1, wherein the carbonaceous particles are insoluble in the catholyte.

5. The lithium oxygen battery of claim 1, wherein the carbonaceous particles are comprised of carbon.

6. The lithium oxygen battery of claim 1, wherein the carbonaceous particles are present in the catholyte in a % w/w of between 1 and 50% w/w.

7. The lithium oxygen battery of claim 1, further comprising a porous cathode current collector.

8. The lithium oxygen battery according to claim 7, wherein said porous cathode current collector comprises a porous material selected from the group comprising carbon paper, reticulated vitreous carbon, reticulated vitreous carbon coated with conductive carbon black, mesoporous carbons, activated carbons, nanostructured carbons and combinations thereof.

9. The lithium oxygen battery of claim 1, further comprising two electrical contacts.

10. The lithium oxygen battery according to claim 9, wherein one electrical contact is connected to a positive terminal of the battery and the other electrical contact is connected to a negative terminal of the battery.

11. The lithium oxygen battery according to claim 1, further comprising a separator, wherein the separator is preferably located between the lithium anode and the porous cathode current collector.

12. The lithium oxygen battery according to claim 1, further comprising a pump, wherein said pump circulates the catholyte in the battery.

13. A semi-solid, non-aqueous flowable catholyte, comprising an electrolyte, dissolved oxygen and carbonaceous particles.

14. An electric vehicle comprising the lithium oxygen battery of claim 1.

15. The electric vehicle of claim 14, wherein said electric vehicle is selected from the group comprising automobiles, motorbikes, lorries, scooters, bicycles.

16. A stationary plant comprising the lithium oxygen battery of claim 1.

17. The stationary plant of claim 16, wherein said stationary plant is selected from the group comprising renewable energy plants.

* * * * *